(12) United States Patent
Cho

(10) Patent No.: US 10,986,297 B2
(45) Date of Patent: Apr. 20, 2021

(54) IMAGE SENSOR CAPABLE OF REMOVING A HORIZONTAL BAND NOISE PHENOMENON AND ELECTRONIC DEVICE HAVING THE SAME

(71) Applicant: SAMSUNG ELECTRONICS CO., LTD., Suwon-si (KR)

(72) Inventor: Kyu Ik Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/286,899

(22) Filed: Feb. 27, 2019

(65) Prior Publication Data

US 2020/0036925 A1    Jan. 30, 2020

(30) Foreign Application Priority Data

Jul. 25, 2018  (KR) .................. 10-2018-0086521

(51) Int. Cl.
*H04N 5/335*      (2011.01)
*H04N 5/378*      (2011.01)
*H04N 5/369*      (2011.01)

(52) U.S. Cl.
CPC .......... *H04N 5/378* (2013.01); *H04N 5/3696* (2013.01)

(58) Field of Classification Search
CPC ............................ H04N 5/378; H04N 5/3696
USPC ....................................................... 348/294
See application file for complete search history.

(56) References Cited

U.S. PATENT DOCUMENTS

| 6,163,342 | A  | * | 12/2000 | Suzuki ............... H04N 1/00795 |
|           |    |   |         | 348/222.1 |
| 8,625,014 | B2 |   | 1/2014  | Yoo et al. |
| 9,143,119 | B2 |   | 9/2015  | Sohn |
| 9,736,412 | B2 |   | 8/2017  | Koyama et al. |
| 9,848,140 | B2 |   | 12/2017 | Deng et al. |
| 9,900,520 | B2 |   | 2/2018  | Isobe |
| 2007/0183006 | A1 | * | 8/2007 | Lee .................. H04N 5/3575 |
|              |    |   |        | 358/513 |
| 2009/0009635 | A1 | * | 1/2009 | Maeda ................ H04N 5/374 |
|              |    |   |        | 348/241 |
| 2011/0205386 | A1 | * | 8/2011 | Koseki ............... H04N 5/3742 |
|              |    |   |        | 348/222.1 |
| 2011/0279718 | A1 |   | 11/2011 | Yoo et al. |
| 2012/0120300 | A1 |   | 5/2012  | Dai |
| 2014/0111676 | A1 |   | 4/2014  | Koyama et al. |
| 2015/0123832 | A1 |   | 5/2015  | Sohn |
| 2016/0344962 | A1 |   | 11/2016 | Hirai |
| 2017/0019609 | A1 |   | 1/2017  | Isobe |
| 2017/0289470 | A1 |   | 10/2017 | Deng et al. |
| 2018/0035064 | A1 |   | 2/2018  | Hoshina et al. |

* cited by examiner

*Primary Examiner* — Usman A Khan
(74) *Attorney, Agent, or Firm* — Sughrue Mion, PLLC

(57) ABSTRACT

An image sensor is provided. The image sensor includes a pixel array including a plurality of pixels connected between a plurality of row lines and a plurality of column lines; an analog-to-digital converter configured to convert each of a plurality of column signals received through the plurality of column lines into a plurality of first digital signals, and convert a level of the plurality of row lines into a second digital signal; and a compensator configured to generate digital pixel data based on the plurality of first digital signals and the second digital signal.

17 Claims, 9 Drawing Sheets

IMAGE SENSOR CAPABLE OF REMOVING A HORIZONTAL BAND NOISE PHENOMENON AND ELECTRONIC DEVICE HAVING THE SAME

CROSS-REFERENCE TO RELATED APPLICATION

This application claims priority from Korean Patent Application No. 10-2018-0086521, filed on Jul. 25, 2018 in the Korean Patent Office, the disclosure of which is incorporated by reference herein in its entirety.

BACKGROUND

1. Field

Methods and apparatuses consistent with example embodiments relate to an image sensor and an electronic device having the same.

2. Description of Related Art

An image sensor may include a pixel array in which pixels that are connected between row lines and column lines generate digital pixel data based on light reflected by a subject that is incident on the pixels. However, when bright light is reflected to some pixels and dark light is reflected to other pixels connected to the same row line of the pixel array, a horizontal band noise (HBN) phenomenon, in which pixel signals generated by the pixels connected to the same row line are brightened due to coupling between the column lines and the row lines, may occur.

SUMMARY

Example embodiments provide an image sensor capable of removing a horizontal band noise (HBN) phenomenon and an electronic device having the same.

According to an aspect of an example embodiment, there is provided an image sensor that includes a pixel array including a plurality of pixels connected between a plurality of row lines and a plurality of column lines; an analog-to-digital converter configured to convert each of a plurality of column signals received through the plurality of column lines into a plurality of first digital signals, and convert a level of the plurality of row lines to generate a second digital signal; and a compensator configured to generate digital pixel data based on the plurality of first digital signals and the second digital signal.

According to an aspect of an example embodiment, there is provided an image sensor including: a pixel array including a plurality of pixels connected between a plurality of row lines and a plurality of column lines; at least one dummy line disposed in the same direction as that of the plurality of row lines; an analog-to-digital converter (ADC) configured to convert a plurality of column signals received through the plurality of column lines into a plurality of first digital signals, and convert a dummy line voltage of the at least one dummy line into a second digital signal; and a compensator configured to generate digital pixel data based on the plurality of first digital signals and the second digital signal.

According to an aspect of an example embodiment, there is provided an image sensor configured to generate digital pixel data based on light incident on the image sensor; a processor configured to process the digital pixel data, and generate image data based on the digital pixel data; and a display configured to display an image based on the image data. The image sensor includes: a pixel array including a plurality of pixels connected between a plurality of row lines and a plurality of column lines, an analog-to-digital converter configured to convert each of a plurality of column signals received through the plurality of column lines into a plurality of first digital signals, and convert a level of the plurality of row lines to generate a second digital signal, and a compensator configured to generate the digital pixel data based on the plurality of first digital signals and the second digital signal.

BRIEF DESCRIPTION OF THE DRAWINGS

The above and other aspects, features and advantages will be more clearly understood from the following detailed description taken in conjunction with the accompanying drawings in which.

DETAILED DESCRIPTION

Figure 1:
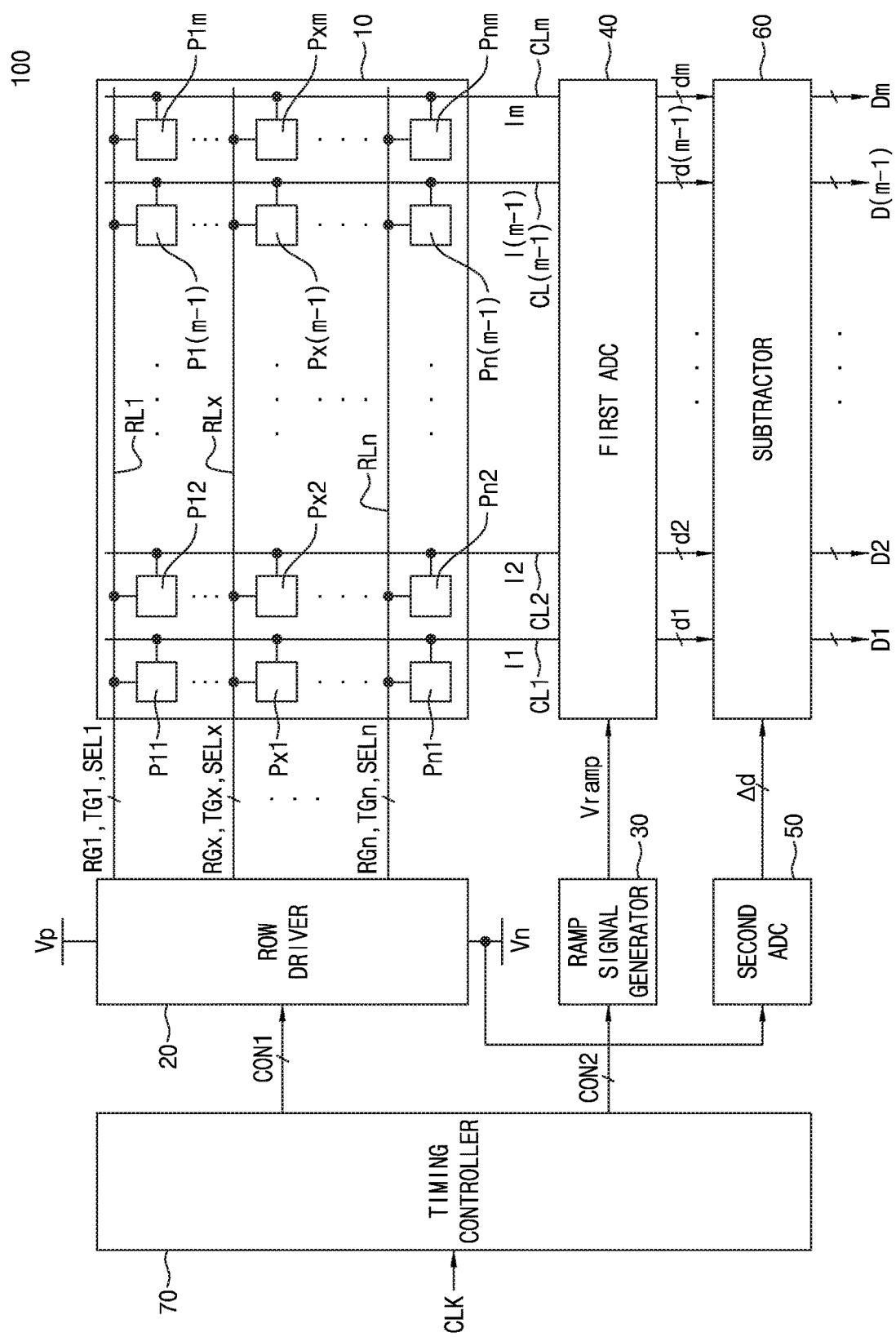
FIG. 1 is a block diagram illustrating a configuration of an image sensor according to an example embodiment.

FIG. 1 is a block diagram illustrating a configuration of an image sensor 100 according to an example embodiment. As shown in FIG. 1, an image sensor 100 may include a pixel array 10, a row driver 20, a ramp signal generator 30, a first analog-to-digital converter (ADC) 40, a second ADC 50, a subtractor 60, and a timing controller 70.

These components will be described in more detail below.

The pixel array 10 may include 'n' row lines RL1 to RLn which are laterally disposed, and 'm' column lines CL1 to CLm. The row driver 20 is configured to transmit n reset signals RG1 to RGn, n transmission signals TG1 to TGn, and n selection signals SEL1 to SELn. Column lines CL1 to CLm are configured to transmit column signals I1 to Im from n×m pixels P11 to Pnm connected between (at intersections of) the row lines RL1 to RLn and the column lines CL1 to CLm.

The row driver 20 may drive the reset signals RG1 to RGn, the transmission signals TG1 to TGn, and the selection signals SEL1 to SELn using a positive driving voltage Vp (for example, a source voltage or a high voltage which is higher than or equal to the source voltage) or a negative driving voltage Vn (for example, a ground voltage) based on a first control signal CON1. The positive driving voltage Vp may include positive voltages Vprg, Vptg, Vpsel which are the same or different from each other for driving each of the reset signals RG1 to RGn, the transmission signals TG1 to TGn, and the selection signals SEL1 to SELn. The negative driving voltage Vn may include negative voltages Vnrg, Vntg, Vnsel which are the same or different from each other for driving each of the reset signals RG1 to RGn, the transmission signals TG1 to TGn, and the selection signals SEL1 to SELn.

The ramp signal generator 30 may generate a ramp signal Vramp based on a second control signal CON2.

The first ADC 40 may receive the column signals I1 to Im via column lines CL1 to CLm, and the ramp signal Vramp from the ramp signal generator 30. The first ADC 40 may compare the ramp signal Vramp and the column signals I1 to Im to generate comparison result signals, and count the comparison result signals to generate first digital signals d1 to dm. Each of the first digital signals d1 to dm may be i-bit data. Each of the column signals I1 to Im may be a pixel reset signal or pixel signal.

The second ADC 50 may convert levels of the row lines RL1 to RLn into a second digital signal Δd when the pixel signals are output through the column lines CL1 to CLm. For example, the second ADC 50 may convert a level of the negative driving voltage Vn changed according to the levels of the row lines RL1 to RLn into the second digital signal Δd, as illustrated in the drawing. The second ADC 50 may convert a level of the positive driving voltage Vp, which changes according to the levels of the row lines RL1 to RLn, into the second digital signal Δd. The second digital signal Δd may be j-bit data, and a value of j may be less than that of i.

The subtractor 60 may subtract the second digital signals Δd from each of the first digital signals d1 to dm to generate each of digital pixel data D1 to Dm.

The timing controller 70 may generate the first control signal CON1 and the second control signal CON2 based on a clock signal CLK. The timing controller 70 may control operation timings of the first ADC 40, the second ADC 50, and the subtractor 60.

Figure 2:
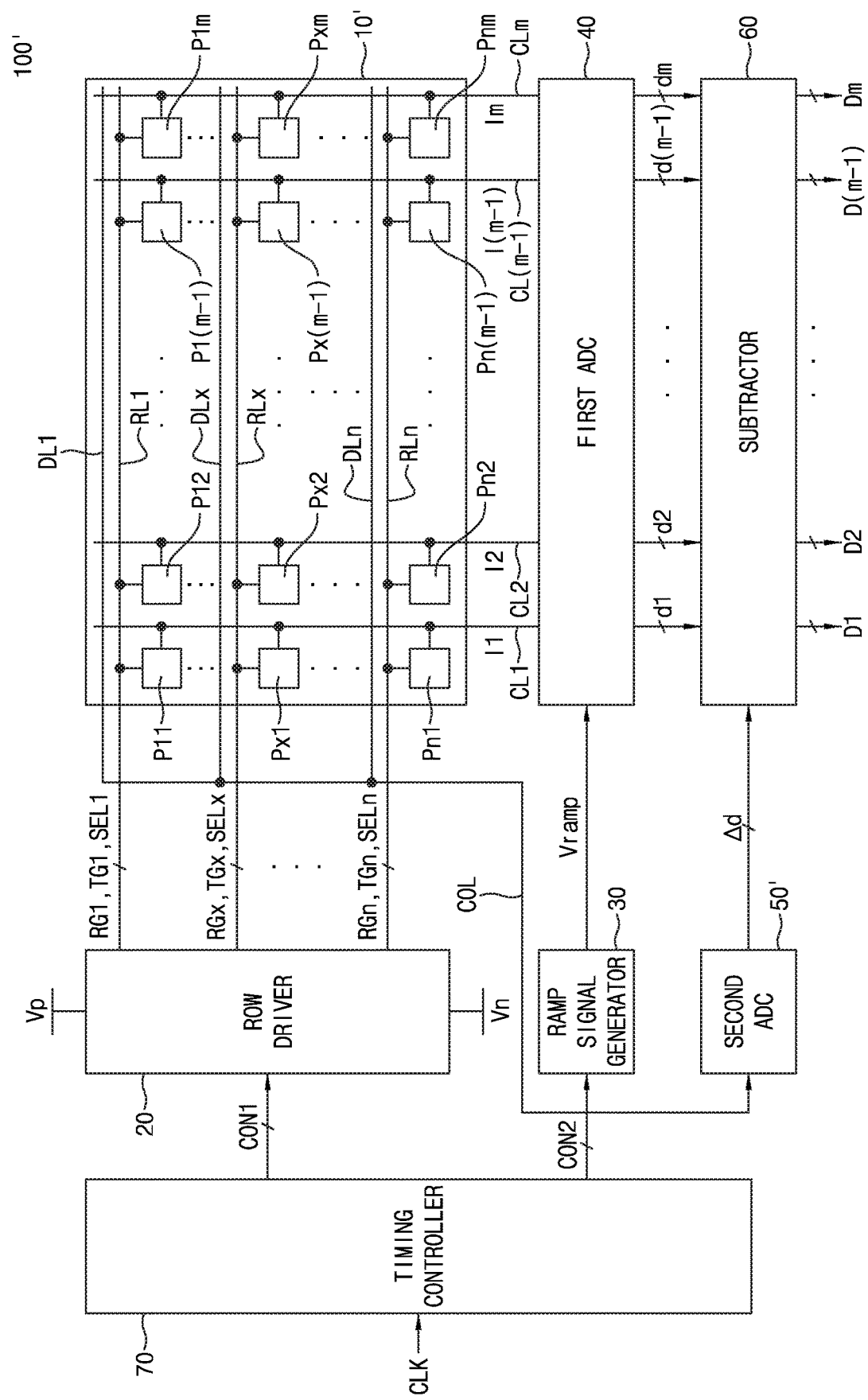
FIG. 2 is a block diagram illustrating a configuration of an image sensor according to an example embodiment.

FIG. 2 is a block diagram illustrating a configuration of an image sensor 100' according to an example embodiment. Image sensor 100' may include a pixel array 10' and a second ADC 50'.

In FIG. 2, the pixel array 10' may further include dummy lines DL1 to DLn disposed in the same direction as the row lines RL1 to RLn. The dummy lines DL1 to DLn may be commonly connected to a common line COL. Although the n dummy lines DL1 to DLn in which the number thereof is the same as that of the row lines RL1 to RLn are disposed in FIG. 2, example embodiments are not limited thereto, and a pixel array may include other quantities of dummy lines. For example, a pixel array may include only one dummy line. The dummy line may be disposed between the pixel array 10' and the first ADC 40.

The second ADC 50' may be connected to the common line COL, and when pixel signals are output through the column lines CL1 to CLm, the second ADC 50' may convert a level of the common line COL, which changes according to levels of the dummy lines DL1 to DLn, into a second digital signal Δd.

In the image sensor 100 or 100' illustrated in FIG. 1 or 2, the first ADC 40 and the second ADC 50 may be formed as one integrated analog-to-digital converter, and the subtractor 60 may be a compensator configured to compensate the first digital signals d1 to dm using the second digital signal Δd.

In the image sensor 100 or 100' illustrated in FIGS. 1 and 2, because levels of some pixel signals of the pixels connected to the selected row line sharply decrease when the pixel signals are output through the column lines CL1 to CLm, the levels of the row lines RL1 to RLn and dummy lines DL1 to DLn may decrease due to coupling between the column lines CL1 to CLm and the row lines RL1 to RLn or dummy lines DL1 to DLn. Thus, levels of the pixel signals may also decrease. In this case, in the image sensor 100 or 100' illustrated in FIGS. 1 and 2, the second ADC 50 or 50' may convert the levels of the row lines RL1 to RLn or dummy lines DL1 to DLn into the second digital signal Δd, and the subtractor 60 may subtract the second digital signal Δd from the first digital signals d1 to dm, and generate digital pixel data D1 to Dm.

Figure 3:
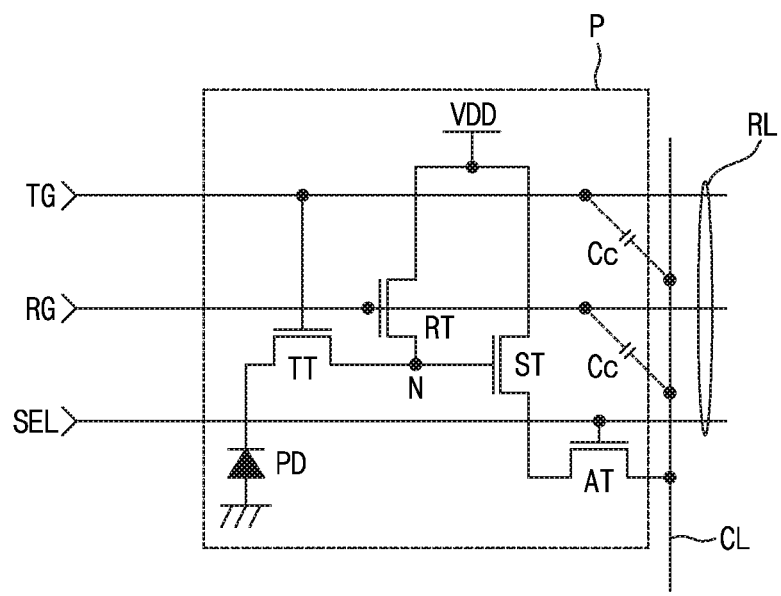
FIG. 3 is a circuit diagram illustrating a configuration of a pixel according to an example embodiment.

FIG. 3 is a circuit diagram illustrating a configuration of a pixel according to an example embodiment. In FIG. 3, a pixel P may include a photo diode PD, a transmission transistor TT, a reset transistor RT, a source follower transistor ST, and a selection transistor AT.

These components will be described in detail below.

When a reset signal RG is activated, the reset transistor RT is turned on and a floating diffusion node N is reset to a reset voltage (for example, a voltage of VDD or VDD−Vth). Here, the voltage of Vth may be a threshold voltage of the reset transistor RT.

When light reflected by a subject is incident on photo diode PD, the photo diode PD may accumulate an amount of electric charges corresponding to an amount of reflected light for a light accumulation time period.

When a transmission signal TG is activated, the transmission transistor TT may be turned on and transmit electric charges accumulated in the photo diode PD to the floating diffusion node N. A reset voltage of the floating diffusion node N may be changed in proportion to the transmitted amount of electric charges to generate a pixel voltage.

The source follower transistor ST may generate a pixel reset signal or pixel signal corresponding to the reset voltage or pixel voltage of the floating diffusion node N.

When a selection signal SEL is enabled, the selection transistor AT may be turned on and transmit the pixel reset signal or pixel signal.

In the image sensor according to the example embodiments, each of the pixels P11 to Pnm of the pixel array 10 or 10' may have a four transistor configuration like the pixel P illustrated in FIG. 3. However, each of the pixels P11 to Pnm may also have additional transistors, or fewer transistors. For example, one pixel configuration may include three transistors. Another example includes five transistors. Further, other configurations may be used.

Figure 4:
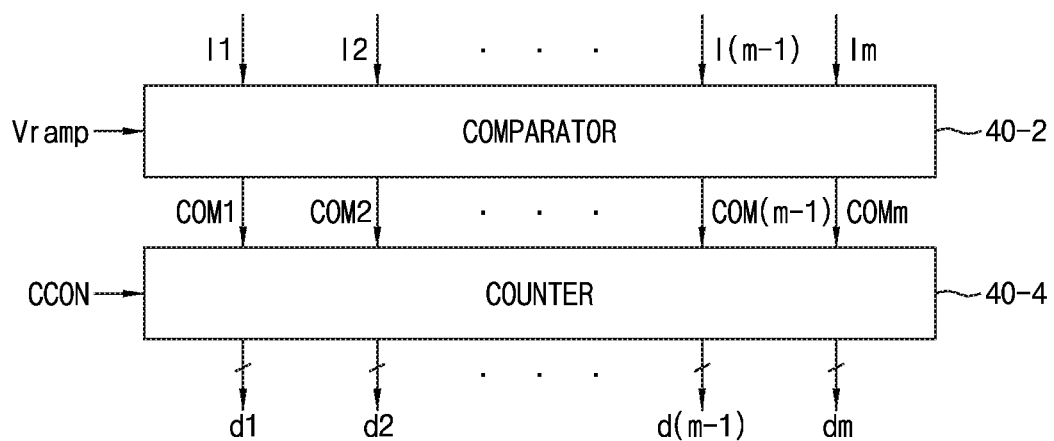
FIG. 4 is a block diagram illustrating a configuration of a first analog-to-digital converter (ADC) of an image sensor according to an example embodiment.

FIG. 4 is a block diagram illustrating a configuration of the first ADC of the image sensor according to the inventive concept, and the first ADC 40 may include a comparator 40-2 and a counter 40-4.

Functions of these components will be described below.

The comparator 40-2 compares a ramp signal Vramp with each of column signals I1 to Im, and generates comparison result signals COM1 to COMm. The comparator 40-2 may compare the ramp signal Vramp and each of pixel reset signals, and generate first comparison result signals, and compare the ramp signal Vramp and each of pixel signals to generate second comparison result signals.

The counter 40-4 may perform a counting operation based on a counter control signal CCON and each of the comparison result signals COM1 to COMm to generate first digital signals d1 to dm. The counter 40-4 may perform the counting operation based on the first comparison result signals and the second comparison result signals, and generate the first digital signals d1 to dm.

Figure 5:
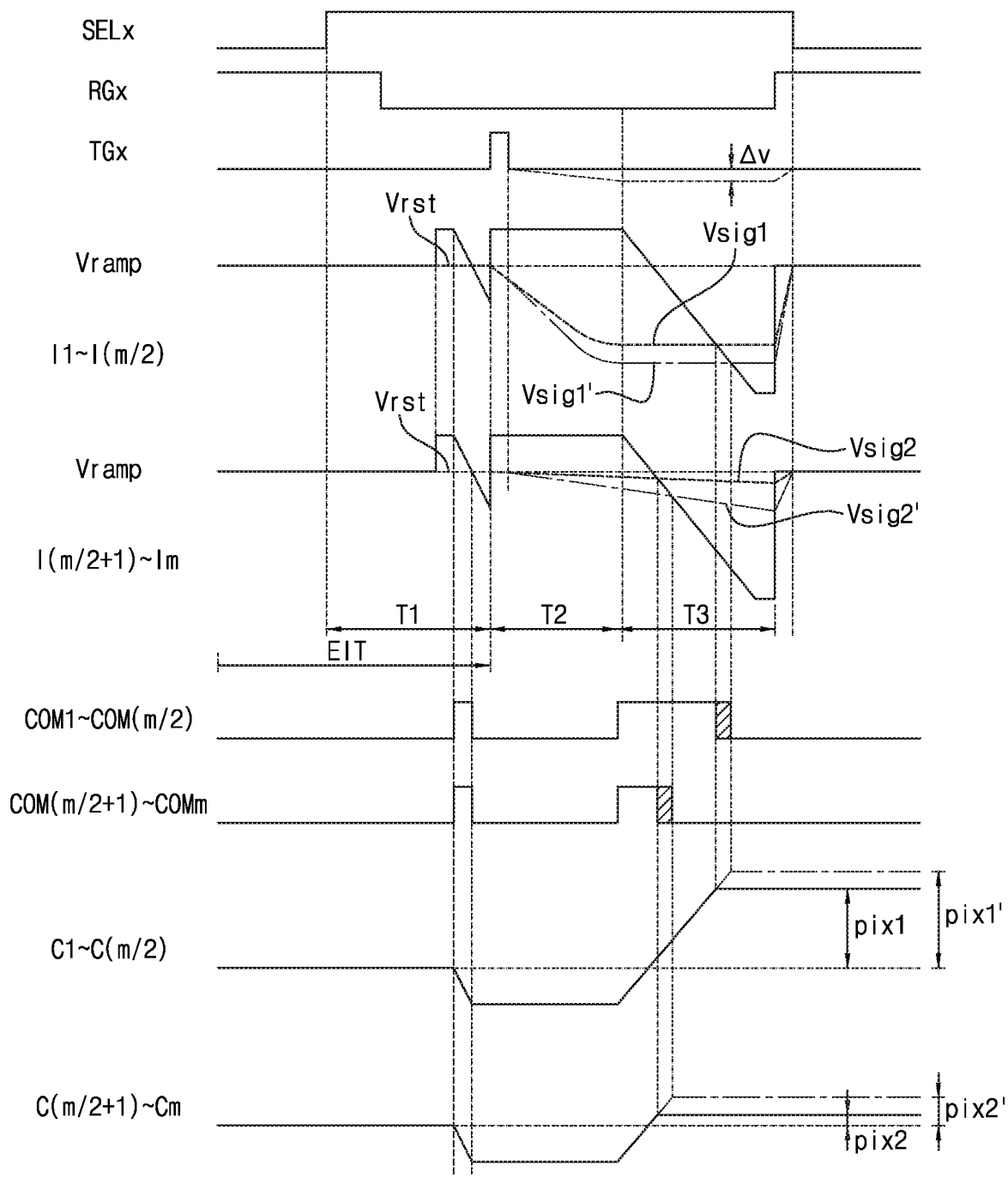
FIG. 5 is an operation timing diagram for describing an operation of the image sensor according to an example embodiment.

FIG. 5 is an operation timing diagram for describing an operation of the image sensor according to an example embodiment. FIG. 5 relates to an operation in a case in which, in a rolling shutter mode, an $x^{th}$ row line RLx is selected, and light having the same brightness is reflected to and is incident on pixels Px1 to Px(m/2) connected between the $x^{th}$ row line RLx and the column lines CL1 to CL(m/2), and light having the same darkness is reflected to and is incident on pixels Px(m/2+1) to Pxm connected to the $x^{th}$ row line RLx and the column lines CL(m/2+1) to CLm.

Referring to FIGS. 1 to 5, when the row driver 20 generates an $x^{th}$ selection signal SELx of a "high" level, a reset signal RGx of a "high" level, and a transmission signal TGx of a "low" level during a first time period T1, the transmission transistors TT of the pixels Px1 to Pxm are turned off, and the reset transistors RT and the selection transistors AT are turned on to generate reset voltages at the floating diffusion nodes N. In addition, pixel reset signals Vrst corresponding to the reset voltages of the floating diffusion nodes N generated through the source follower transistors ST and the selection transistors AT of the pixels Px1 to Pxm may be generated.

In addition, when the ramp signal generator 30 generates a ramp signal Vramp during the first time period T1, the comparator 40-2 may compare the ramp signal Vramp and the pixel reset signal Vrst output from each of the pixels Px1 to Pxm to generate comparison result signals COM1 to COMm. When the ramp signal Vramp is lowered and the pixel reset signal Vrst is less than the ramp signal Vramp, the comparator 40-2 may generate first comparison result signals COM1 to COMm. The counter 40-4 may perform a down counting operation based on the counter control signal CCON and each of the first comparison result signals COM1 to COMm to generate counting output signals C1 to Cm. In FIG. 4, the counting output signals C1 to Cm show a decrease in code value, and the counter 40-4 may actually generate i-bit first digital signals d1 to dm.

When the row driver 20 generates a selection signal SELx of a "high" level, a reset signal RGx of a "low" level, and a transmission signal TGx of a "high" level during a second time period T2, the transmission transistors TT of the pixels Px1 to Pxm may be turned on and transmit an amount of electric charges corresponding to an amount of reflected light accumulated in the photo diodes PD to the floating diffusion nodes N during a light accumulation time period EIT. Accordingly, a pixel voltage may be generated at the floating diffusion node N of each of the pixels Px1 to Pxm. A pixel signal Vsig1 or Vsig2 corresponding to the pixel voltage of the floating diffusion node N generated through the source follower transistor ST and the selection transistor AT of each of the pixels Px1 to Pxm may be generated.

However, the transmission signal TGx may be transitioned to a "low" level (for example, the negative voltage Vntg) during the second time period T2. Bright light may be incident on the pixels Px1 to Px(m/2) so that column signals I1 to I(m/2) illustrated by dotted lines may be generated, and dark light may be incident on the pixels Px(m/2+1) to Pxm so that the column signals I(m/2+1) to Im illustrated by dotted lines may be generated. In this case, as illustrated in the drawing, the column signals I1 to I(m/2) may be sharply lowered. Accordingly, levels of the reset signals RG1 to RGn, and levels of the transmission signals TG1 to TGn (or levels of the dummy lines DL1 to DLn) transmitted through the row lines RL1 to RLn may be lowered by a predetermined level Δv due to coupling Cc between the column lines CL1 to CL(m/2) and the row lines RL1 to RLn (or the dummy lines DL1 to DLn). In the rolling shutter mode, in a case in which the reset signal RGx is a "low" level (for example, the negative voltage Vnrg) during the second time period T2, because the reset signals RG1 to RG(x-1) and RG(x+1) to RGn (all reset signals other than reset signal RGx) may be "high" levels (for example, the positive voltage Vprg), a level of the positive driving voltage Vp (for example, Vprg) changed according to the levels of the reset signals RG1 to RG(x-1) and RG(x+1) to RGn may be lowered by the predetermined level Δv. In addition, in the rolling shutter mode, because all the transmission signals TG1 to TGn may be "low" levels (for example, the negative voltage Vntg) during the second time period T2, a level of the negative driving voltage Vn (for example, Vntg) changed according to the levels of the transmission signals TG1 to TGn may be lowered by the predetermined level Δv. Accordingly, the pixel signals Vsig1 and Vsig2 transmitted through the column lines CL1 to CLm may be lowered, and thus pixel signals Vsig1' and Vsig2' may be generated.

When the ramp signal generator 30 generates the ramp signal Vramp during a third time period T3, the comparator 40-2 may compare the ramp signal Vramp and the pixel signal Vsig1 output from each of the pixels Px1 to Px(m/2) to generate second comparison result signals COM1 to COM(m/2), and compare the ramp signal Vramp and the pixel signal Vsig2 output from each of the pixels Px(m/2+1) to Pxm to generate the second comparison result signals COM(m/2+1) to COMm. When the ramp signal Vramp is lowered and the pixel signal Vsig1 or Vsig2 is less than the ramp signal Vramp, the comparator 40-2 may generate the second comparison result signals COM1 to COMm. The counter 40-4 may perform an up counting operation based on the counter control signal CCON and each of the second comparison result signals COM1 to COMm to generate the counting output signals C1 to Cm. In FIG. 5, the counting output signals C1 to Cm show an increase in code value. Actually, the counter 40-4 may generate the i-bit first digital signals d1 to dm. As a result, the counter 40-4 may generate the first digital signals d1 to d(m/2) corresponding to pixel values pix1, and generate the second digital signals d(m/2+1) to dm corresponding to pixel values pix2.

However, during the third time period T3, the levels of the pixel signals Vsig1 and Vsig2 transmitted through the column lines CL1 to CLm may be lowered by the predetermined level Δv, and thus the pixel signals Vsig1' and Vsig2' may be generated. The comparator 40-2 may compare the ramp signal Vramp and each of the pixel signals Vsig1' to generate the second comparison result signals COM1 to COM(m/2) in which a pulse width is increased by a portion with inclined lines, and compare the ramp signal Vramp and each of the pixel signals Vsig2' to generate the second comparison result signals COM(m/2+1) to COMm in which a pulse width is increased by a portion with inclined lines. The counter 40-4 may generate the first digital signals d1 to d(m/2) corresponding to pixel values pix1' and the first digital signals d(m/2+1) to dm corresponding to pixel values pix2'. That is, code values of the first digital signals d1 to dm may increase. Accordingly, when an image is displayed on a display, a horizontal band noise (HBN) phenomenon in which image signals corresponding to the pixels Px1 to Pxm connected to the same row lines RLx of the pixel array 10 or 10' are brightened may occur, and thus a lateral stripe pattern may be present in digital signals d1 to dm.

The second ADC 50 may convert the levels of the row lines RL1 to RLn (or dummy lines DL1 to DLn) into the second digital signal Δd.

The subtractor 60 may generate the digital pixel data D1 to Dm by subtracting the second digital signal ΔV from each of the first digital signals d1 to dm. Accordingly, when an image is displayed, for example on a display, the lateral stripe pattern may not be perceived.

Figure 6:
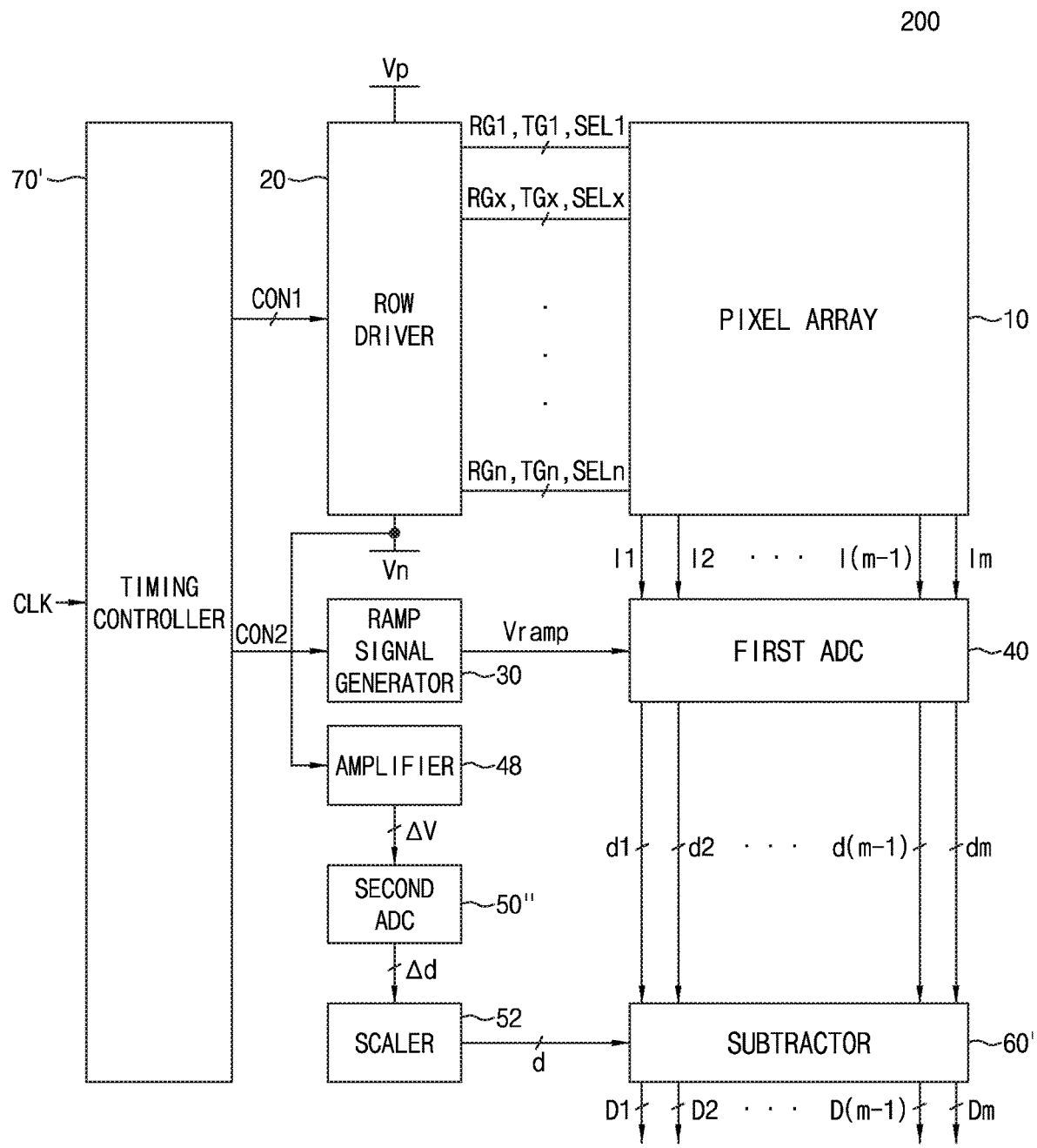
FIG. 6 is a block diagram illustrating a configuration of an image sensor according to an example embodiment.

FIG. 6 is a block diagram illustrating a configuration of an image sensor 200 according to an example embodiment. As shown, an image sensor 200 may further include an amplifier 48 and a scaler 52 in addition to the configuration of the image sensor 100 illustrated in FIG. 1, a second ADC 50", a subtractor 60', and a timing controller 70'.

Functions of these components will be described below.

A pixel array 10, a row driver 20, a ramp signal generator 30, and a first ADC 40 may serve as the pixel array 10, the row driver 20, the ramp signal generator 30, and the first ADC 40 illustrated in FIGS. 1 and 2.

The amplifier 48 may amplify a level Δv of a negative driving voltage Vn changed according to levels of row lines RL1 to RLn to generate an amplified level ΔV. The amplifier 48 may amplify the level Δv of the negative driving voltage Vn and output the amplified level ΔV when the level Δv of the negative driving voltage Vn is low.

The second ADC 50" may convert the amplified level ΔV into a digital signal to generate a second digital signal Δd.

The scaler 52 may reduce a size of the second digital signal Δd to generate a size-reduced second digital signal d. The subtractor 60' may generate digital pixel data D1 to Dm by subtracting the size-reduced second digital signal d from each of first digital signals d1' to dm' in which noise is added.

The timing controller 70' may generate a first control signal CON1 and a second control signal CON2 based on a clock signal CLK. The timing controller 70' may additionally generate control signals for controlling other components.

Figure 7:
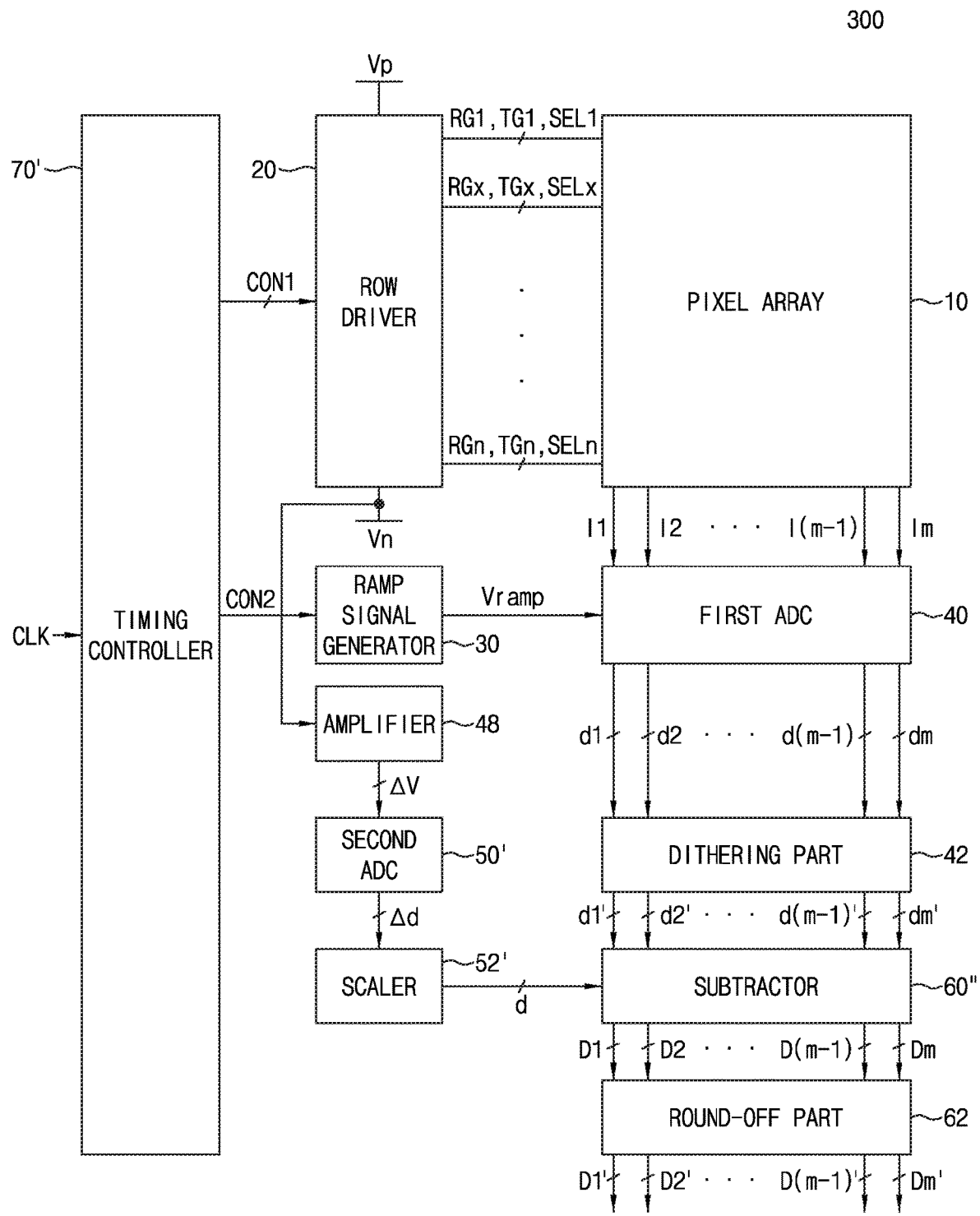
FIG. 7 is a block diagram illustrating a configuration of an image sensor according to an example embodiment.

FIG. 7 is a block diagram illustrating a configuration of an image sensor according to an example embodiment, and an image sensor 300 may further include a dithering part 42 and a round-off part 62 in addition to the configuration of the image sensor 200 illustrated in FIG. 6, a scaler 52', and a subtractor 60".

Functions of these components will be described below.

The components which are illustrated in FIG. 7 and denoted by reference numerals which are the same as those of the components illustrated in FIG. 6 may serve as the components illustrated in FIG. 6. Hereinafter, only the functions of the added or substituted components will be described.

The dithering part 42 may add noise data to each of first digital signals d1 to generate noise-added first digital signals d1' to dm', and random digital data as the noise data may be added to a decimal part. For example, in a case in which each of the first digital signals d1 to dm is i-bit digital data, the dithering part 42 may generate the noise-added first digital signals d1' to dm' in decimal form in which i-bit digital data is included in an integer part and k-bit digital data (noise data) is included in a decimal part.

Like the scaler 52 illustrated in FIG. 6, the scaler 52' may reduce a size of a second digital signal Δd to generate a size-reduced signal d, and in a case in which the second digital signal Δd is j-bit digital data, the scaler 52' may generate a size-reduced second digital signal d in decimal form in which (j−k)-bit data is included in an integer part and k-bit data is included in a decimal part.

The subtractor 60" may subtract the size-reduced second digital signal d in decimal form from each of the noise-added the first digital signals d1' to dm' in decimal form, to generate the digital pixel data D1 to Dm. The digital pixel data D1 to Dm may be digital data in decimal form.

The round-off part 62 may round off the decimal part of each of the digital pixel data D1 to Dm to generate final digital pixel data D1' to Dm'.

However, example embodiments are not limited thereto. According to an example embodiment, the subtractor 60" may remove the decimal part of each of the digital pixel data D1 to Dm in decimal form to generate the digital pixel data D1 to Dm without including the round-off part 62.

Figure 8A:
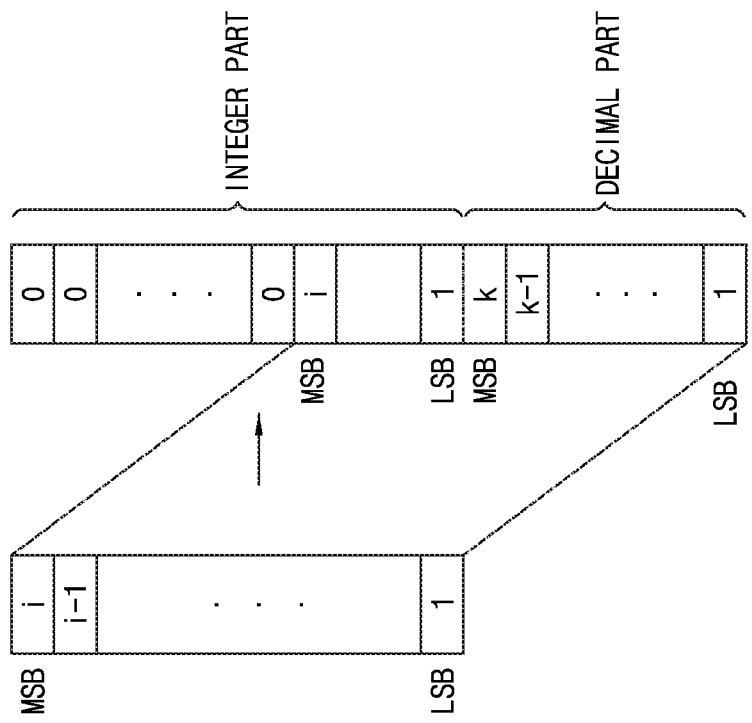
FIGS. 8A and 8B are drawings for describing dithering and scaling operations according to an example embodiment.
Figure 8B:
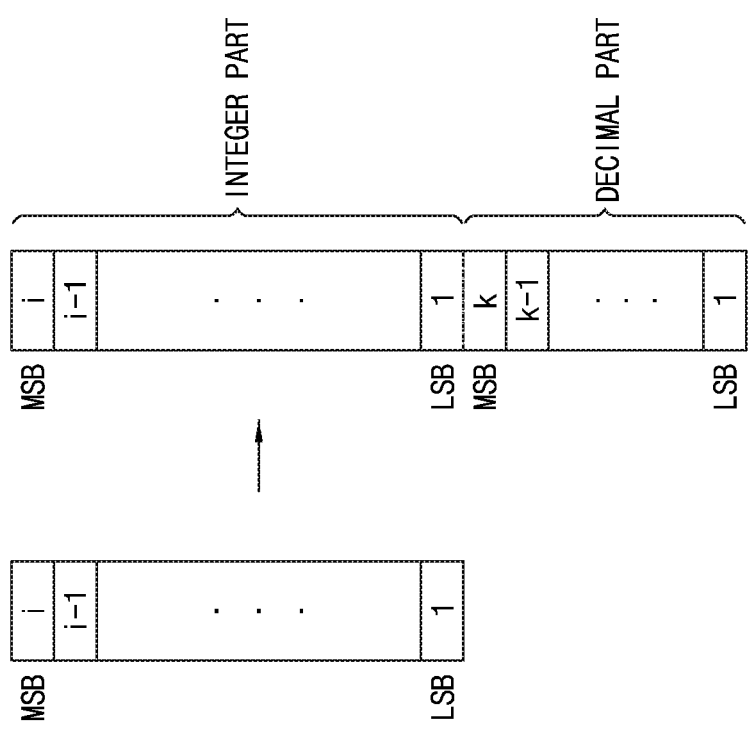

FIGS. 8A and 8B are drawings for describing operations of the dithering part 42 and the scaler 52' according to the example embodiment.

FIG. 8A is a drawing for describing the operation of the dithering part 42', and when each of the first digital signals d1 to dm is i-bit digital data, the dithering part 42 may generate the noise-added first digital signals d1' to dm' in decimal form in which i-bit digital data is included in an integer part and k-bit digital data which is noise data is included in a decimal part. For example, when i is 10, k is 6, the i-bit digital data is "1110000011," and the k-bit digital data is "001110," each of the noise-added first digital signals d1' to dm' in binary form is "1110000011.001110." Decimal notation of "1110000011.001110" is 899.21875. That is, the dithering part 42 may receive "1110000011" ("899" in decimal notation), and generate "1110000011.001110" ("899.21875" in decimal notation).

FIG. 8B is a drawing for describing the operation of the scaler 52', and when the size-reduced second digital signal d is j-bit digital data, the scaler 52" may generate the size-reduced second digital signal d in decimal form in which lower k-bit digital data among j-bit digital data is included in a decimal part and (j−k)-bit digital data is included in an integer part. For example, when j is 10, k is 6 and the j-bit digital data is "0011001110," the size-reduced second digital signal d in binary form is "0000000011.001110." That is, upper six bits of the size-reduced second digital signal d in binary form may be filled with "0." Decimal notation of "0011001110" is "206", and decimal notation of "0000000011.001110" is "3.21875". That is, the scaler 52" may receive "0011001110" ("206" in decimal notation) to generate size-reduced "0000000011.001110" ("3.21875" in decimal notation).

Referring to FIG. 7, the subtractor 60" may subtract "0000000011.001110" from "1110000011.001110" to generate "11100000000.000000" ("896" in decimal notation). In addition, the round-off part 62 may generate "11100000000.000000" ("896" in decimal notation) because there are no values to be rounded off to a decimal part.

Figure 9:
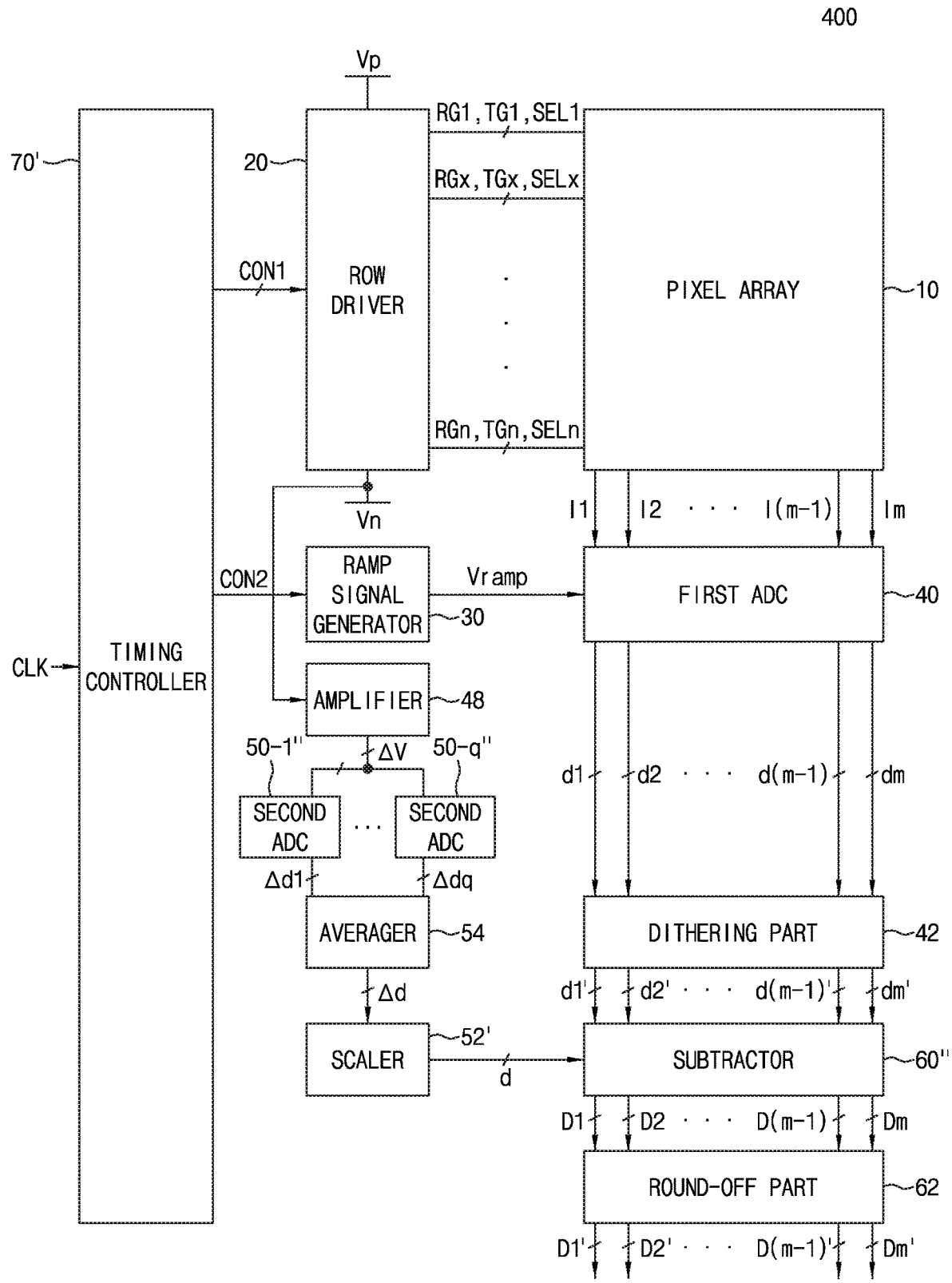
FIG. 9 is a block diagram illustrating a configuration of an image sensor according to an example embodiment.

FIG. 9 is a block diagram illustrating a configuration of an image sensor according to an example embodiment, and an image sensor 400 may further include an averager 54 in addition to the configuration of the image sensor 300 illustrated in FIG. 7 and may include q second ADCs 50-1' to 50-$q'$.

Functions of these components will be described below.

The components illustrated in FIG. 9 and denoted by reference numerals which are the same as those of the components illustrated in FIG. 7 may serve as the components illustrated in FIG. 7. Hereinafter, only the functions of the added or substituted components will be described.

The q second ADCs 50-1' to 50-$q'$ may convert amplified levels ΔV output from an amplifier 48 into digital signals to generate q second digital signals Δd1 to Δdq.

The averager 54 may generate an average value of the q second digital signals Δd1 to Δdq to generate a final second digital signal Δd. That is, the averager 54 may generate the average value in which a sum value of the q second digital signals Δd1 to Δdq is divided by q.

Because the image sensor 400 illustrated in FIG. 9 further includes multiple second ADCs 50-1' to **50-*q'* and the averager 54, the image sensor 400 can decrease noise which may be added when one second ADC 50'** is used.

The amplifier 48 of the image sensor 200, 300, or 400 illustrated in FIGS. 6, 7, and 9 may receive the positive driving voltage Vp changed according to the levels of the row lines RL1 to RLn and amplify the level of the positive driving voltage Vp to generate the amplified level ΔV.

The amplifier 48 of the image sensor 200, 300, or 400 illustrated in FIGS. 6, 7, and 9 may be substituted by an attenuator. In this case, when pixel signals are generated through the column lines CL1 to CLm, because a level of the positive driving voltage Vp or negative driving voltage Vn changed according to a change in levels of the reset signals RG1 to RGn may be high, the amplifier 48 of the image sensor 200, 300, or 400 illustrated in FIGS. 6, 7, and 9 may be substituted by the attenuator.

In addition, the pixel array 10 of the image sensor 200, 300, or 400 illustrated in FIGS. 6, 7, and 9 may be substituted by the pixel array 10' illustrated in FIG. 2. In this case, the image sensor 200, 300, or 400 illustrated in FIGS. 6, 7, and 9 may be configured to apply a specific voltage to the dummy lines DL1 to DLn during a predetermined time period (for example, with reference to FIG. 5, a time period in which the selection signal SELx having a "high" level is applied, or a time period in which the second time period T2 and the third time period T3 are added).

The amplifier 48 and the attenuator illustrated in FIGS. 6, 7, and 9 may be a level converter configured to convert a level of an input signal to a level-converted signal.

The first ADC 40 and the second ADC 50" or 50-1" to **50-*q"* of the image sensor 200, 300, or 400 illustrated in FIGS. 6, 7, and 9 may be configured by one integrated analog-to-digital conversion part, and the subtractor 60' or 60" may be a compensator configured to compensate the noise-added first digital signals d1' to dm' output from the dithering part 42 using the size-reduced second digital signal d output from the scaler 52 or 52'**.

Figure 10:
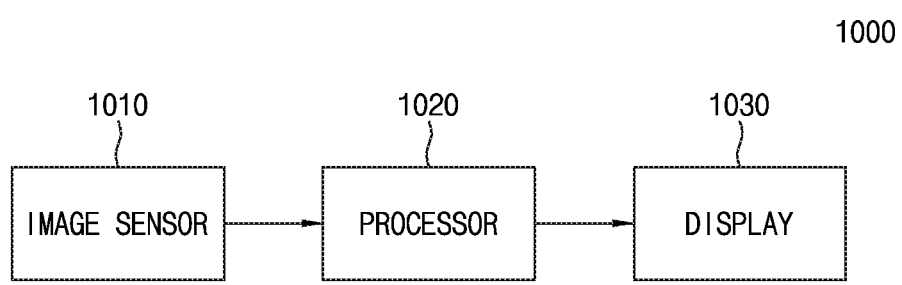
FIG. 10 is a block diagram illustrating an electronic device including the image sensor according to the example embodiment.

FIG. 10 is a block diagram illustrating an electronic device including the image sensor according to the example embodiments, and an electronic device 1000 may include an image sensor 1010, a processor 1020, and a display 1030.

The image sensor 1010 may generate pixel data based on light reflected by a subject that is incident on the image sensor 1010. The image sensor 1010 may have the configuration illustrated in FIG. 1, 2, 6, 7, or 9.

The processor 1020 may process the digital pixel data output from the image sensor 1010 to generate an image signal. For example, the process may be an image signal process.

The display 1030 may receive the image signal to display an image thereon.

In the electronic device 1000 illustrated in FIG. 10, although levels of pixel signals transmitted through column lines CL1 to CLm of the image sensor 1010 are sharply lowered so that levels of the row lines RL1 to RLn or dummy lines DL1 to DLn are lowered, and accordingly the levels of the pixel signals are lowered, a lateral stripe pattern may not be perceived in an image displayed on the display 1030.

According to the example embodiments, when pixel signals are generated through column lines, a horizontal band noise (HBN) in which pixel signals of pixels connected to same row line of a pixel array are brightened due to coupling between row lines or dummy lines and column lines cannot occur. Accordingly, a lateral stripe pattern is not perceived in a displayed image.

Therefore, according to the example embodiments, reliability of operations of an image sensor and an electronic device having the same can be improved.

At least one of the components, elements, modules or units represented by a block as illustrated in FIGS. 1, 2, 4, 6, 7, 9 and 10 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, communication between the components, elements, modules or units may be performed through a bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

Although the example embodiments have been described with reference to the accompanying drawings, it will be understood by those skilled in the art that modifications and variations could be made without departing from the scope of the present disclosure.

What is claimed is:

1. An image sensor comprising:
   a pixel array including a plurality of pixels connected between a plurality of row lines and a plurality of column lines;
   an analog-to-digital converter (ADC) configured to convert each of a plurality of column signals received through the plurality of column lines into a plurality of first digital signals, and convert a level of the plurality of row lines into a second digital signal; and
   a compensator configured to compensate the plurality of first digital signals using the second digital signal to generate digital pixel data,
   wherein each of the plurality of row lines comprises a reset line, a transmission line, and a selection line, and
   wherein the ADC comprises:
   a first ADC configured to generate the plurality of first digital signals based on the plurality of column signals; and a second ADC configured to generate the second digital signal based on a driving voltage applied to the reset line or the transmission line and changed according to a change in the level of the plurality of row lines.

2. The image sensor of claim 1, wherein each of the plurality of pixels comprises:
a reset transistor configured to provide a reset voltage at a floating diffusion node based on a reset signal received via the reset line;
a photo diode configured to generate a pixel voltage corresponding to an amount of light incident on the photo diode;
a transmission transistor configured to provide the pixel voltage to the floating diffusion node based on a transmission signal received via the transmission line;
a source follower transistor configured to generate a pixel output signal based on the reset voltage or the pixel voltage of the floating diffusion node; and
a selection transistor configured to transmit the pixel output signal based on a selection signal received via the selection line.

3. The image sensor of claim 1, further comprising a ramp signal generator configured to generate a ramp signal,
wherein the first ADC comprises:
a comparator configured to compare the ramp signal and the plurality of column signals based on the reset voltages to generate first comparison result signals and compare the ramp signal and the plurality of column signals based on the pixel voltages to generate second comparison result signals; and
a counter configured to perform a counting operation based on the first comparison result signals and the second comparison result signals to generate the plurality of first digital signals.

4. The image sensor of claim 1, further comprising:
a level converter configured to generate a level-converted signal by converting the level of the driving voltage; and
a scaler configured to generate a size-reduced second digital signal by reducing a size of the second digital signal,
wherein the second ADC is further configured to generate the second digital signal based on the level-converted signal, and
wherein the compensator comprises a subtractor configured to generate the digital pixel data by subtracting the size-reduced second digital signal from each of the plurality of first digital signals.

5. The image sensor of claim 4, wherein the level converter configured to amplify or attenuate the level of the driving voltage.

6. The image sensor of claim 4, further comprising a dithering circuit configured to generate noise-added first digital signals, wherein each of the plurality of first digital signals are included in an integer part and noise data is included in a decimal part,
wherein the scaler is further configured to generate the size-reduced second digital signal in which some bits of the second digital signal are included in the integer part and remaining bits of the second digital signal are included in the decimal part.

7. The image sensor of claim 6, wherein the subtractor is further configured to subtract the size-reduced second digital signal from each of the noise-added first digital signals, and generate the digital pixel data, and wherein the image sensor further comprises a round-off circuit configured to generate final digital pixel data by rounding off the decimal part of the digital pixel data.

8. The image sensor of claim 4, wherein the second ADC is one of a plurality of second ADCs configured to generate a plurality of second digital signals, and
wherein the image sensor further comprises an averager configured to calculate an average value of the plurality of second digital signals and output the average value as the second digital signal.

9. An image sensor comprising:
a pixel array comprising a plurality of pixels connected between a plurality of row lines and a plurality of column lines;
at least one dummy line disposed in the same direction as that of the plurality of row lines;
an analog-to-digital converter (ADC) configured to convert a plurality of column signals received through the plurality of column lines into a plurality of first digital signals, and convert a dummy line voltage of the at least one dummy line into a second digital signal; and
a compensator configured to compensate the plurality of first digital signals using the second digital signal to generate digital pixel data,
wherein the ADC comprises:
a first ADC configured to generate the plurality of first digital signals based on the plurality of column signals; and
a second ADC configured to generate the second digital signal based on the dummy line voltage, and
wherein the at least one dummy line is included in the pixel array or between the pixel array and the ADC, and the dummy line voltage is changed according to a change in a level of the plurality of row lines.

10. The image sensor of claim 9, further comprising:
a level converter configured to generate a level-converted signal based on the dummy line voltage; and
a scaler configured to generate a size-reduced second digital signal by reducing a size of the second digital signal,
wherein the second ADC is further configured to generate the second digital signal based on the level-converted signal, and
wherein the compensator comprises a subtractor configured to generate the digital pixel data by subtracting the size-reduced second digital signal from each of the plurality of first digital signals.

11. The image sensor of claim 10, further comprising a dithering circuit configured to generate noise-added first digital signals, wherein each of the plurality of first digital signals are included in an integer part and noise data is included in a decimal part,
wherein the scaler is further configured to generate the size-reduced second digital signal in which some bits of the second digital signal are included in the integer part and remaining bits of the second digital signal are included in the decimal part.

12. The image sensor of claim 11, wherein the subtractor is further configured to subtract the size-reduced second digital signal from each of the noise-added first digital signals, and generate the digital pixel data, and
wherein the image sensor further comprises a round-off circuit configured to generate final digital pixel data by rounding off the decimal part of the digital pixel data.

13. The image sensor of claim 10, wherein the second ADC is one of a plurality of second ADCs configured to generate a plurality of second digital signals, and wherein the image sensor further comprises an averager configured to calculate an average value of the plurality of second digital signals and output the average value as the second digital signal.

14. An electronic device comprising:
an image sensor configured to generate digital pixel data based on light incident on the image sensor;
a processor configured to process the digital pixel data, and generate image data based on the digital pixel data; and
a display configured to display an image based on the image data,
wherein the image sensor comprises:
a pixel array comprising a plurality of pixels connected between a plurality of row lines and a plurality of column lines,
an analog-to-digital converter (ADC) configured to convert each of a plurality of column signals received through the plurality of column lines into a plurality of first digital signals, and convert a level of the plurality of row lines into a second digital signal, and
a compensator configured to compensate the plurality of first digital signals using the second digital signal to generate the digital pixel data,
wherein each of the plurality of row lines comprises:
a reset line;
a transmission line; and
a selection line, and
wherein the ADC comprises:
a first ADC configured to generate the plurality of first digital signals based on the plurality of column signals; and
a second ADC configured to generate the second digital signal based on a driving voltage applied to the reset line or the transmission line and changed according to a change in the level of the plurality of row lines.

15. The electronic device of claim 14, wherein the image sensor further comprises at least one dummy line disposed in the same direction as that of the plurality of row lines.

16. The electronic device of claim 15, wherein the image sensor further comprises:
a level converter configured to generate a level-converted signal based on a dummy line voltage of the at least one dummy line; and
a scaler configured to generate a size-reduced second digital signal by reducing a size of the second digital signal,
wherein the second ADC is further configured to generate the second digital signal based on the level-converted signal, and
wherein the compensator comprises a subtractor configured to generate the digital pixel data by subtracting the size-reduced second digital signal from each of the plurality of first digital signals.

17. The electronic device of claim 16, wherein the image sensor further comprises:
a dithering circuit configured to generate noise-added first digital signals, wherein each of the plurality of first digital signals are included in an integer part and noise data is included in a decimal part; and
a round-off circuit configured to generate final digital pixel data by rounding off the decimal part of the digital pixel data,
wherein the scaler is further configured to generate the size-reduced second digital signal in which some bits of the second digital signal are included in the integer part and remaining bits of the second digital signal are included in the decimal part, and
wherein the subtractor is further configured to generate the digital pixel data by subtracting the size-reduced second digital signal from each of the noise-added first digital signals.

* * * * *